UNITED STATES PATENT OFFICE.

HENRY M. BROOKFIELD, OF NEW YORK, N. Y.

PROCESS FOR MAKING A COMPOUND OF GLASS.

1,143,885. Specification of Letters Patent. Patented June 22, 1915.

No Drawing. Application filed January 27, 1912, Serial No. 673,715. Renewed May 10, 1915. Serial No. 27,241.

*To all whom it may concern:*

Be it known that I, HENRY M. BROOKFIELD, a citizen of the United States, residing at New York city, New York, have invented certain new and useful Improvements in Processes for Making a Compound of Glass, of which the following is a clear, full, and exact description.

This invention relates to a process for making a compound of glass much tougher and harder in quality than ordinary glass now known, and which glass compound is particularly suitable for use as insulators and other glass articles requiring a tough, non-fragile and durable quality.

In general the compound formed by this process is characterized by a large percentage of an oxid of one of the alkaline earths. It is well-known among glass manufacturers that the presence of calcium oxid (CaO) or lime imparts a tough quality to glass, but heretofore it has been impossible to increase the percentage of lime in the glass to any great extent. If too large a proportion of lime is added as one of the original ingredients of the batch which is to be formed into the glass, it will render the batch infusible at the temperatures ordinarily employed, or if the batch is partially fused, it is found that the lime collects in irregular, unfused lumps throughout the mass, destroying its homogeneity and resulting in an almost worthless product. Although among glass manufacturers the recipes for the batch are mostly empirical, it is believed that at present not more than ten to fifteen per cent. of the batch is lime, either in the form of pure calcium oxid or in the form of a salt which breaks up into the oxid during fusion, and it is believed that any larger percentage of lime in the batch than that above indicated would result in the worthless product above described.

My process contemplates the progressive addition of the oxid to the other elements of which the glass is composed.

Describing my process and the compound obtained thereby more particularly, I first obtain a finely pulverized cullet which may be scrap glass of different descriptions and probably containing proportions of both lime and lead glass, or I may manufacture glass in the ordinary way and grind it into pulverized form. Of course if the cullet is manufactured, it will be preferable to obtain it by the lime glass process on account of the cheapness of the lime. Into the pulverized cullet, presumably already containing as one of its constituents as much lime as ordinary glass may possess, I mix thoroughly by any suitable mechanical means a pulverized oxid of one of the alkaline earths, for instance calcium oxid (CaO) or lime. In place of pure lime I may of course add any of the usual salts or hydrates of the alkaline earths, provided they are capable of furnishing the oxid when fused in the mixed mass. For example, I may employ in the mixture ordinary powdered marble or chalk, calcium carbonate, ($CaCo_3$), in place of lime, since this compound during the subsequent fusion of the mass apparently breaks down into the oxid (CaO) with consequent escape of carbonic acid gas ($Co_2$). The escape of gas from the fused mass, however, causes bubbles which may in some cases destroy the homogeneity of the resulting product. Consequently the use of the oxid of the calcium or other alkaline earth is preferred over the salts and hydrates.

The cullet and the lime or its equivalent above described may be ground separately into their pulverized form and afterward mixed if desired, but I find it preferable to grind these ingredients together since a more intimate, uniform and thorough mixture is thus obtained.

The mixture is then heated to approximately 2500° F. for fusing or partially melting the same into a homogeneous mass having the lime evenly distributed and thoroughly incorporated in the same. The proportion of lime in this heated mixture is preferably high enough to result in a semi-plastic, semi-liquid mass at the temperature stated, which is workable into shape for various glass articles. The material upon cooling may be either amorphous or devitrified, but at any rate it is found to be of uniform character throughout and a much tougher and harder product than ordinary glass.

The exact proportions of lime or its equivalent added to the mixture may vary within wide limits since any addition of lime whatever to the glass cullet results in a tougher product than ordinary glass and the maximum limit is only that amount which will allow the heated mixture to sufficiently fuse together into a homogeneous mass workable into shapes, but obviously no silica is added to the ground cullet. I have found that suitable proportions for the mixture may be thirty pounds (30 lbs.) of lime or its equivalent, to every one hundred pounds (100 lbs.) of cullet.

If, during fusion, bubbles of gas escape, due to the presence of impurities or to the employment of salts in the mixture as before stated, the mass should not be allowed to cool until this bubbling ceases and the mass is quiescent. As this often requires a longer heating of the mass, and consequent greater expense, a further reason is seen for preferring the oxids in the original mixture over the carbonates or other salts. For the same reasons of economy the calcium compounds are preferred over those of the other more expensive alkaline earths such as barium, strontium, etc.

The term fusion is used herein to indicate that blending or coalescence of the mixed materials, through melting or partial melting, into a homogeneous mass.

The difficulty of obtaining a uniformly fused mass, has heretofore prevented the introduction of a larger percentage of the lime into the batch mixture in making glass, but in the present method of adding lime to the already obtained glass, we are able to manufacture a glass compound having all qualities due to a larger percentage of lime, and yet of homogeneous structure.

What I claim is:—

1. The process of making a glass compound containing an excess of one ingredient, which comprises the steps of mixing with ground glass, containing the usual amount of said ingredient, a chemical compound of said ingredient such as will furnish the oxid thereof, and fusing the whole to incorporate this excess into the mass.

2. The process of making a glass compound containing an excess of one ingredient, which comprises the steps of forming the cullet with the usual amount of said ingredient, pulverizing said cullet, adding to said cullet, before or after its pulverization, a chemical compound of said ingredient such as will furnish the oxid thereof, and fusing the whole to incorporate this excess into the mass.

3. The process of progressively increasing the lime content of glass, which consists in providing ground lime glass cullet, thoroughly mixing therewith a chemical compound which will furnish the oxid of calcium and then fusing the mixture.

4. The process of progressively increasing the lime content of glass, which consists in providing ground cullet formed from glass containing lime, thoroughly mixing therewith material which will furnish the oxid of calcium during the succeeding steps, the proportion of said oxid of calcium thus furnished being approximately 30 per cent. of the amount of the ground glass added to said mixture, and heating the whole to a temperature of approximately 2500° F. to fuse the mixture.

5. The process of progressively increasing the lime content of glass, which consists in providing ground cullet formed from glass containing lime, thoroughly mixing therewith oxid of calcium, the proportion of the oxid of calcium to the ground glass being as 30 to 100, and heating the mixture to a temperature of approximately 2500° F. to fuse the same.

Signed at New York city this 26" day of January 1912.

HENRY M. BROOKFIELD.

Witnesses:
ABRAM BERNSTEIN,
BEATRICE MIRVIS.